UNITED STATES PATENT OFFICE.

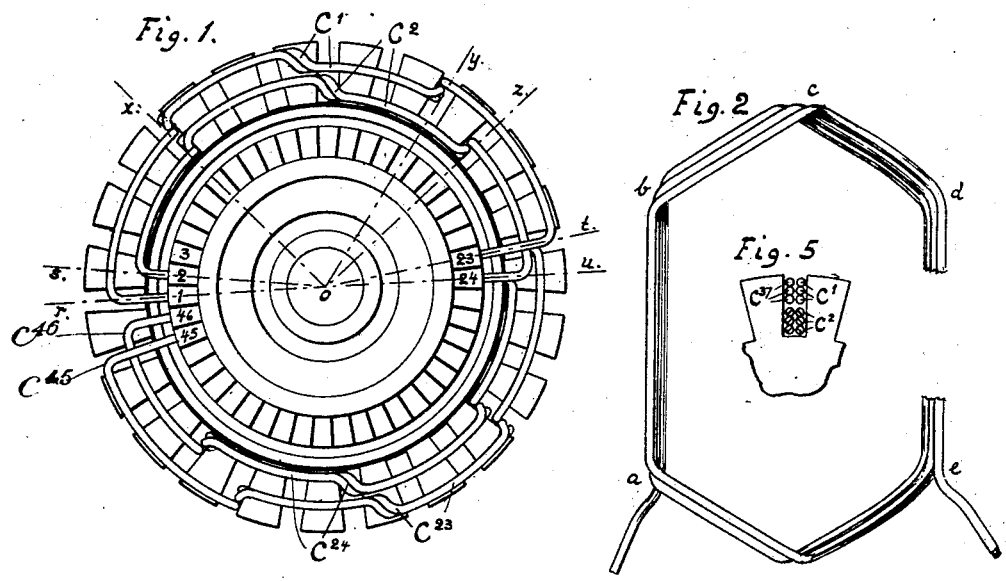

ROBERT LUNDELL, OF NEW YORK, N. Y.

ARMATURE-WINDING FOR ELECTRIC MOTORS OR DYNAMOS.

SPECIFICATION forming part of Letters Patent No. 714,721, dated December 2, 1902.

Application filed January 23, 1902. Serial No. 90,908. (No model.)

*To all whom it may concern:*

Be it known that I, ROBERT LUNDELL, a citizen of the United States, residing at New York, borough of Manhattan, in the county of New York and State of New York, have made a new and useful Invention in Armature-Windings for Electric Motors or Dynamos, of which the following is a specification.

My present invention relates to improvements in the form or shape of the coils for drum-armatures; and it has for its objects, first, to devise a simple style of coil in which the end conductors or connections do not cross the other conductors of the coil as they are brought out to the commutator; second, to devise means for equalizing the electromotive forces, and consequently the load between two sets of coils or windings which are connected together in parallel by means of the brushes, and, third, to so connect each set of coils (or each winding) to the commutator that a correct position of the brushes for one set of coils (or winding) becomes equally correct for the other set of coils.

For a clear understanding of the invention reference is made to the accompanying drawings, in which—

Figure 1 is an end view of an armature provided with a "double series winding," showing two coils for each winding and their connections to the commutator. Fig. 2 is a detail view of one of the novel style of coils which may belong to either set of coils or windings. Fig. 3 is a longitudinal section of one side of the armature, clearly illustrating the relative positions of the two sets of coils. Fig. 4 is a plan development of some of the upper set of coils, showing the manner in which coils rest next to one another and the way the end connections are brought out. Fig. 5 is a detail view of one of the slots in the armature-core, showing the positions and numbers of the conductors per slot in the completed armature.

Referring now to the drawings in detail, it will be noticed on inspection of Fig. 1 that the armature-core has twenty-three slots, the commutator forty-six bars, and that there are two sets of coils forming an upper and a lower winding, as further illustrated in Fig. 3. The lower coils of even index $C^2$, $C^{24}$, &c., to $C^{46}$ (the total number being twenty-three) are connected to the commutator-bars of even numbers, as coils $C^2$ and $C^{24}$ indicate, in the following order: 2, 24, 46, 22, &c., according to the usual rule for a four-pole series winding, the armature illustrated being supposed to run in a four-pole field-magnet. The upper coils of odd index $C'$, $C^{23}$, &c., to $C^{45}$ (their total number being also twenty-three) are connected to the commutator-bars of odd numbers in a similar manner, as follows: 1, 23, 45, 21, &c.

It will be noticed upon further inspection of the drawings, and particularly of Fig. 1, that the two so-called "active" portions of any one coil—that is to say, the two portions of the coil which pass across the face of the armature-core—are equidistant from the center of the armature. In other words, the usual arrangement of an upper and a lower section of said two active portions is done away with and the two active portions or sides of a coil occupy absolutely the same positions relative to the center of the armature. The advantage of this novel style of coil becomes apparent upon inspection of Figs. 2, 3, and 4, which fully disclose the simplicity of the coil itself and the unusually simple manner in which the end connections are brought out.

Fig. 2 is a plan view of any one of the coils as it appears when ready for assembling. It has previously been "shaped" or wound on a suitable form constructed for this purpose. The figure shows a coil having three turns, and it will be understood that the three active conductors from $a$ to $b$ lie in a plane parallel to the side of a tooth on the core, so that when the coil is in its final position on the core the said three conductors will lie close against the left side of a tooth, as shown in Fig. 1. At the corner $b$ the coil has a slight turn and a twist which brings the under conductors upon a level with the upper conductor, all three conductors now running away from the armature-core at an angle which is determined by the width of the three conductors and the necessary clearance between the coils. (See Fig. 4.) At $c$ the three conductors are bent down and caused to run back toward the armature-core in a lower plane, so that they are practically on a level with the lower conductor in the active portion $d\,e$.

As corner $d$ is reached the coil has another turn and a slight twist, which brings the outside conductors between $c$ and $d$, above the inside conductor into such position that the three conductors become parallel with the side of another tooth on the armature-core.

Fig. 1 shows how the three conductors from $d$ to $e$ lie against the right-hand side of a tooth when the coil is in position. It will be noticed that the end connections run from the lower corner at $a$ and from the upper corner at $e$. Between $a$ and $e$ there are of course only two conductors, which are arranged symmetrically with reference to the conductors between $b$ and $d$, as clearly shown on the drawings.

Fig. 4 serves to illustrate the manner in which the coils are assembled. It will be seen that only the end portions of the coils over and under lie one another and that the active portions of the coils—viz., the portions which run across the face of the armature-core—lie side by side in the slots of the core. The figure illustrates also the simple manner in which the end connections are brought out, the lower connections running between the coils to the left on a level with the lower conductor and the upper connections running to the right on a level with the upper conductor.

In order to describe the second and the third objects of the invention, reference is again made to Fig. 1. The lower winding, of which $C^2$ is a sample coil, is so disposed with reference to the poles of the field that the two active portions of any one coil embrace a greater portion of the core than the corresponding portions of a coil belonging to the upper winding. In fact, the angle $x, o, z$ for the lower coils is made slightly larger than the polar pitch angle, which in a four-pole machine is ninety degrees, whereas the angle $x, o, y$ is somewhat smaller than the said pitch angle. This arrangement causes the linear distance between the active portions of the lower and the upper coils to become the same—that is to say, the lower and the upper coils become alike in size as well as in ohmic resistance.

The method of so assembling the coils on the core that the angle between the active conductors of the lower coils is slightly greater than the polar pitch angle and the corresponding angle of the upper coils is smaller than the said polar pitch angle causes the electromotive forces of the two sets of coils to become alike.

I have found in practice that when an upper and a lower winding are both wound in the same slots the electromotive force of the lower winding is slightly lower than of the upper winding, owing to the fact that there is always some leakage of lines of force which causes the lower winding to receive less than its due share of the magnetic flux.

Referring now to the connections to the commutator, (see Fig. 1,) the angles $r, o, x$ of the left-hand connection of coil $C'$ and $y$, $o, t$ of its right-hand connection are both alike—that is to say, the coil or coils of the upper winding are connected without "lead" one way or the other—and the so-called "neutral lines" of commutation will coincide with the center lines of the poles, as well known to those skilled in the art. Upon examination of the lower coil $C^2$ it will be noticed that its left and right-hand connections or angles $s, o, x$ and $z, o, u$ are also alike, from which follows that the neutral lines of commutation for the lower winding will likewise coincide with the center lines of the poles. It will thus be seen that a correct brush position for one winding is equally correct for the other winding.

Having thus described my invention, what I claim, and desire to secure by Letters Patent of the United States, is—

1. A winding for a drum or cylindrical armature, consisting of upper and lower sets of separable coils of similar form or construction disposed in concentric surfaces, the adjacent upper and lower coils being connected to their respective commutator-bars in sequence.

2. A winding for a drum or cylindrical armature, consisting of two or more upper and lower sets of similar separable coils, disposed concentrically, the adjacent upper and lower coils of the different sets being connected in sequence to consecutive commutator-bars.

3. A winding for a slotted drum or core composed of a plurality of similar separable coils, the sides or so-called "active" portions of any one coil being equidistant from the center of the winding and the ends being in two concentric surfaces, one of which surfaces is substantially coincident with the outer edge of the "active" portions, and the other of which is substantially coincident with the inner edge of the said "active" portions.

4. A winding for a slotted drum or core composed of a plurality of similar separable coils of flat or web-like section, the characteristic features being that the sides or "active" portions of the coils have their flat sides parallel with their respective teeth or slots in the core, whereas the end portions of the coils are so twisted that the flat sides are substantially parallel with a cylindrical surface coincident with the outer surface of the armature-core.

5. An armature of the slotted drum type provided with two windings or sets of coils independently connected to a single commutator, one of said windings having its coils wound in slots the angle between which is slightly greater than the polar pitch angle, and the coils of the other winding having its coils wound in slots the angle between which is slightly smaller than the said polar pitch angle.

6. An armature of the slotted drum type provided with two independent windings or sets of coils, wound one above the other and arranged to be connected in parallel, the lower of said windings having its coils wound in slots the angle between which is slightly greater than the polar pitch angle, and the coils of the upper winding having its coils wound in slots, the angle between which is slightly smaller than the said polar pitch angle.

In testimony whereof I have signed my name to this specification in the presence of two subscribing witnesses.

ROBERT LUNDELL.

Witnesses:
C. J. KINTNER,
M. F. KEATING.